(12) United States Patent
Ayler (10) Patent No.: US 7,451,669 B1
(45) Date of Patent: Nov. 18, 2008

(54) NON-SLIP CONTINUOUSLY VARIABLE SPEED TRANSMISSION

(76) Inventor: Clint L. Ayler, 1359 Terracina Dr., El Dorado Hills, CA (US) 95762

( * ) Notice: Subject to any disclaimer, the term of this patent is extended or adjusted under 35 U.S.C. 154(b) by 213 days.

(21) Appl. No.: 11/544,603

(22) Filed: Oct. 10, 2006

(51) Int. Cl.
*F16H 3/22* (2006.01)
(52) U.S. Cl. .............................. 74/341; 74/348; 74/351
(58) Field of Classification Search ................... 74/341, 74/347, 348, 349, 350, 351, 352; 475/299, 475/269, 336, 344, 345
See application file for complete search history.

(56) References Cited

U.S. PATENT DOCUMENTS

| 889,333 | A | 2/1908 | Reenstierna |
|---|---|---|---|
| 955,279 | A | 4/1910 | Moore, Sr. |
| 1,036,690 | A | 8/1912 | Novak |
| 1,416,567 | A | 5/1922 | McNeel |
| 2,033,850 | A | 3/1936 | Roberts, Jr. |
| 2,630,021 | A | 3/1953 | Levin |
| 3,075,397 | A | 1/1963 | Winter |
| 3,279,274 | A * | 10/1966 | Braun ................ 74/351 |
| 6,055,880 | A | 5/2000 | Gogovitza |
| 6,158,296 | A | 12/2000 | Denance |
| 6,338,692 | B1 | 1/2002 | Magyari |
| 6,786,497 | B1 | 9/2004 | Olszewski |
| 6,955,624 | B2 | 10/2005 | Brass |

* cited by examiner

*Primary Examiner*—Roger Pang
*Assistant Examiner*—Derek D Knight
(74) *Attorney, Agent, or Firm*—Shlesinger, Arkwright & Garvey LLP.

(57) ABSTRACT

A non-slip continuously variable speed transmission which includes a circular pin carrier in a housing having input and output drive shafts in which multiple pins extend from the inner hub to the outer rim of the pin carrier and the pins are positioned adjacent each other so as to create a substantially solid body of pins moveable vertically relative to each other and engageable with the gear mechanism by means of a pin lifter.

20 Claims, 8 Drawing Sheets

NON-SLIP CONTINUOUSLY VARIABLE SPEED TRANSMISSION

FIELD OF THE INVENTION

This invention relates to a non-slip variable speed transmission having a pin carrier with multiple adjacent contacting pins engageable with the drive gear which is shiftable, radially with regard to the pin carrier for change of speed of the drive.

BACKGROUND OF THE INVENTION

Variable speed transmissions have been known from the early industrial age in which belt driven transmissions were common. An attempt was made to develop non-slip transmissions to improve efficiency and positive drive. Some early inventions used perforations and pin drive systems such as Reenstierna U.S. Pat. No. 889,333, Novak U.S. Pat. No. 1,036,690, and McNeel U.S. Pat. No. 1,416,567.

Groove and rib devices such as Moore U.S. Pat. No. 955,279 and Winter U.S. Pat. No. 3,075,397 were also designed to eliminate the non-slip aspect of belt driven transmissions.

More recent developments of non-slip transmissions includes such patents as Gogovitza U.S. Pat. No. 6,055,880, Denance U.S. Pat. No. 6,158,296, Magyari U.S. Pat. No. 6,338,692, and Olszewski U.S. Pat. No. 6,786,497.

OBJECTS AND SUMMARY OF THE INVENTION

It is an object of this invention to provide a non-slip variable speed transmission in which the input and output drive will not be subject to excessive shocks or strains as speed changes.

Another object of this invention is to provide a simple and durable construction which will respond easily and quickly to a controlling means and which will transmit power with the highest degree of efficiency.

Yet another object of this invention provides substantially greater structural strength while effecting rapid changes in speed.

Still a further object of this invention is to provide a non-slip variable transmission which allows the load to be distributed over a wider area rather than that of single tooth contact of normal gears.

Yet another object of this invention is to provide a non-slip variable transmission having only a few spinning components thus reducing power loss.

Still a further object is to provide a non-slip variable speed transmission which allows the use of unconventional designs such as parabolic and conically shaped gears. The radius of such gears, as it changes along the length of the drive gear, is not required to maintain a specific ratio with the driven gear and can even have an inversely proportional ratio, as is demonstrated in later figures, which allows for a much wider and non-linear range of gear ratios in a small unit.

Still a further object of this invention is to provide a non-slip variable speed transmission which allows for a much wider gear ratio in a small unit.

Yet another object of this invention is to provide a non-slip variable transmission permitting multiple gear drives to be added for independent power sources which may be at various gear ratios or to transfer power to other mechanisms.

A still further object of this invention is to provide a compact non-slip variable transmission which is shorter than conventional transmissions presently in use.

Another object of this invention is to provide a non-slip variable speed transmission which does not require dedicated microprocessor control/instrumentation as due current CVT's on the market. The standard belt/pulley design requires a microprocessor to regulate the belt tension to keep it from breaking. Such system applies greater tension on the belts at higher loads causing increased power loss which does not occur in this invention.

Still a further object of this invention is to provide a non-slip variable transmission which can be used on cars, boats, farm and construction vehicles, light medium and heavy duty trucks, SUV's, large commercial shipping and hauling transport vehicles, constant speed applications and engine appliances which can increase gas mileage, store energy mechanically and be utilized by any engine type such as gas or diesel.

These and other objects of the invention will be apparent from the following description and drawings which are as followings:

DETAIL DESCRIPTION OF THE INVENTION

FIGS. 1-4

Figure 1:
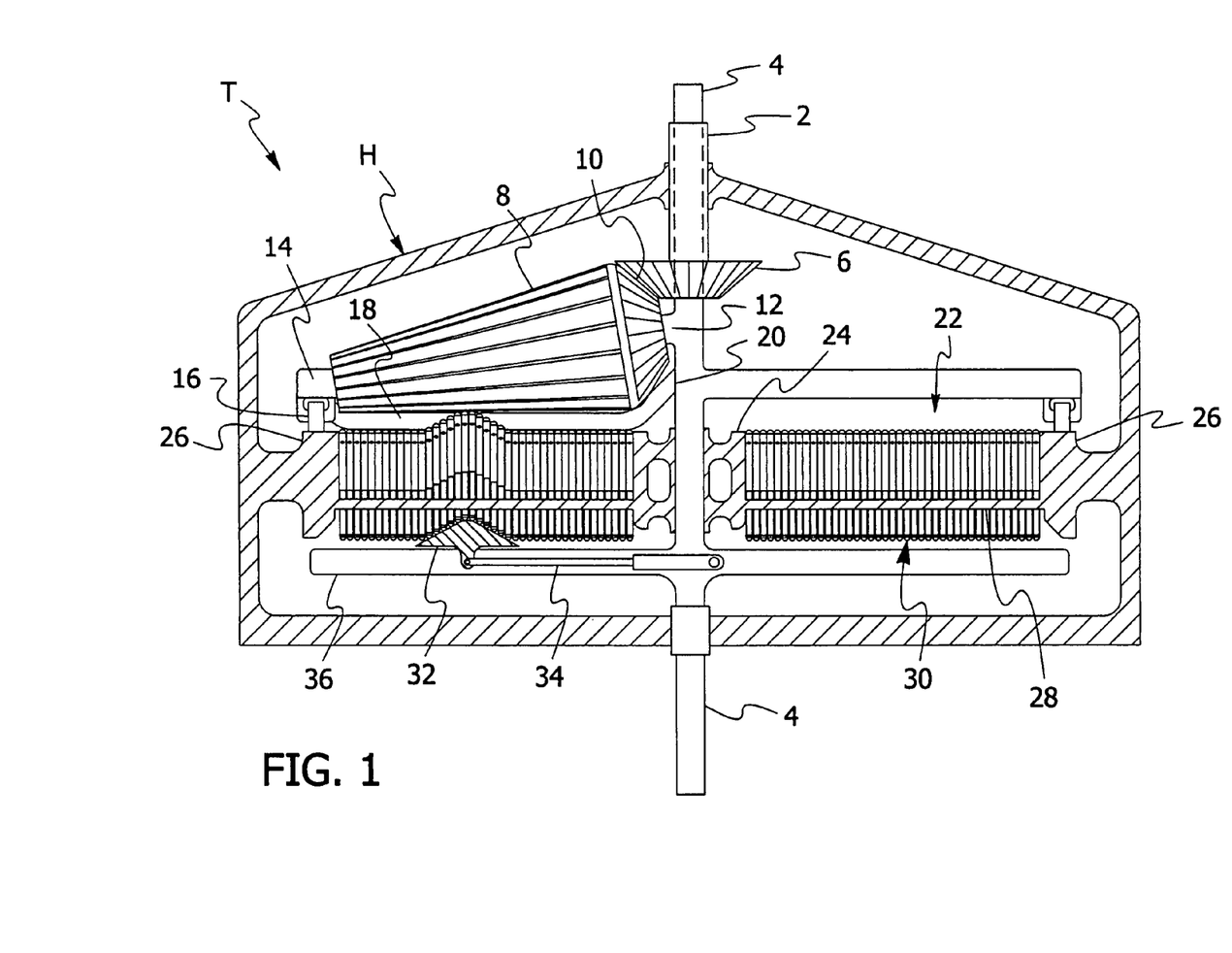
FIG. 1 is a fragmentary cross sectional view of the invention with portions shown in elevation.
Figure 2:
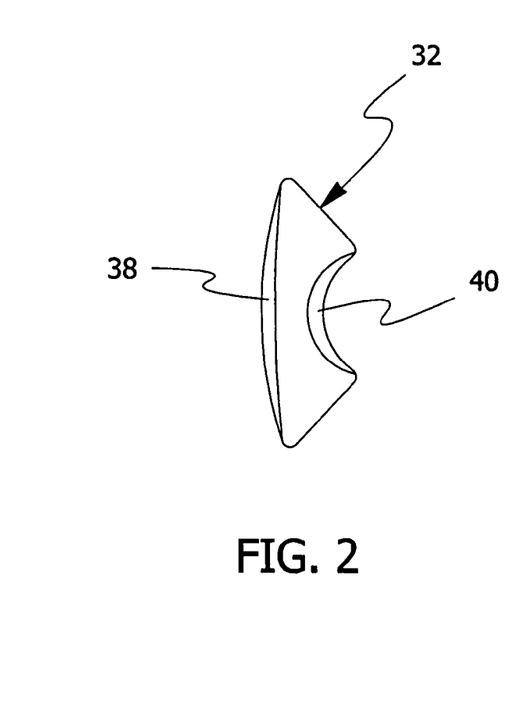
FIG. 2 is a top plan view of the pin lifter shown in FIG. 1.
Figure 3:
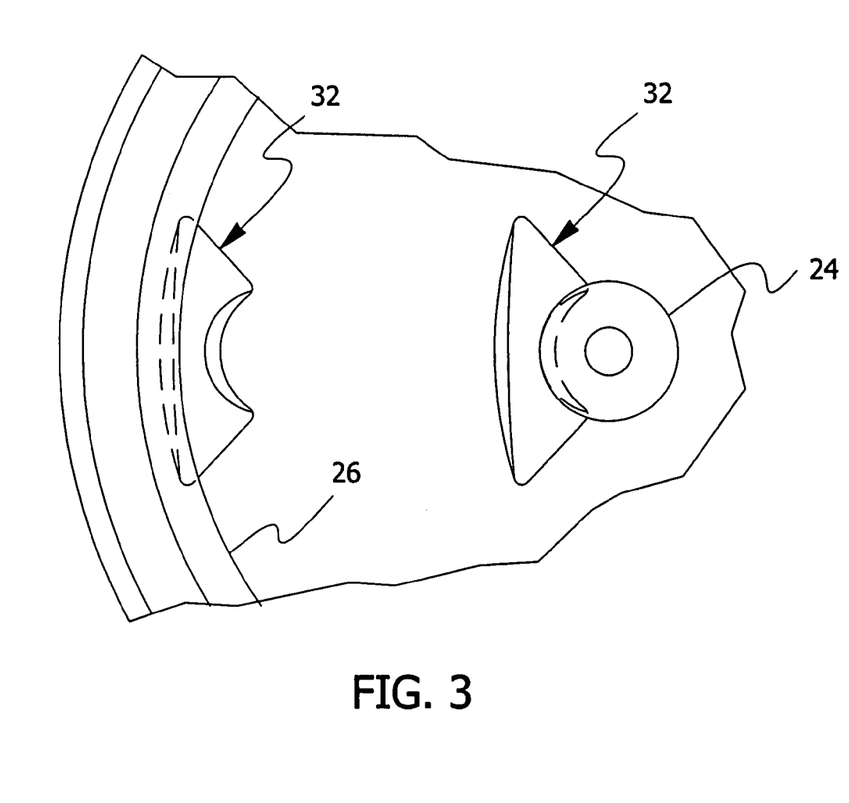
FIG. 3 is a top plan view diagrammatically showing the pin lifter when in engagement with the left rim of the pin carrier and also when in engagement with the left side of the inner hub of the pin carrier.
Figure 4:
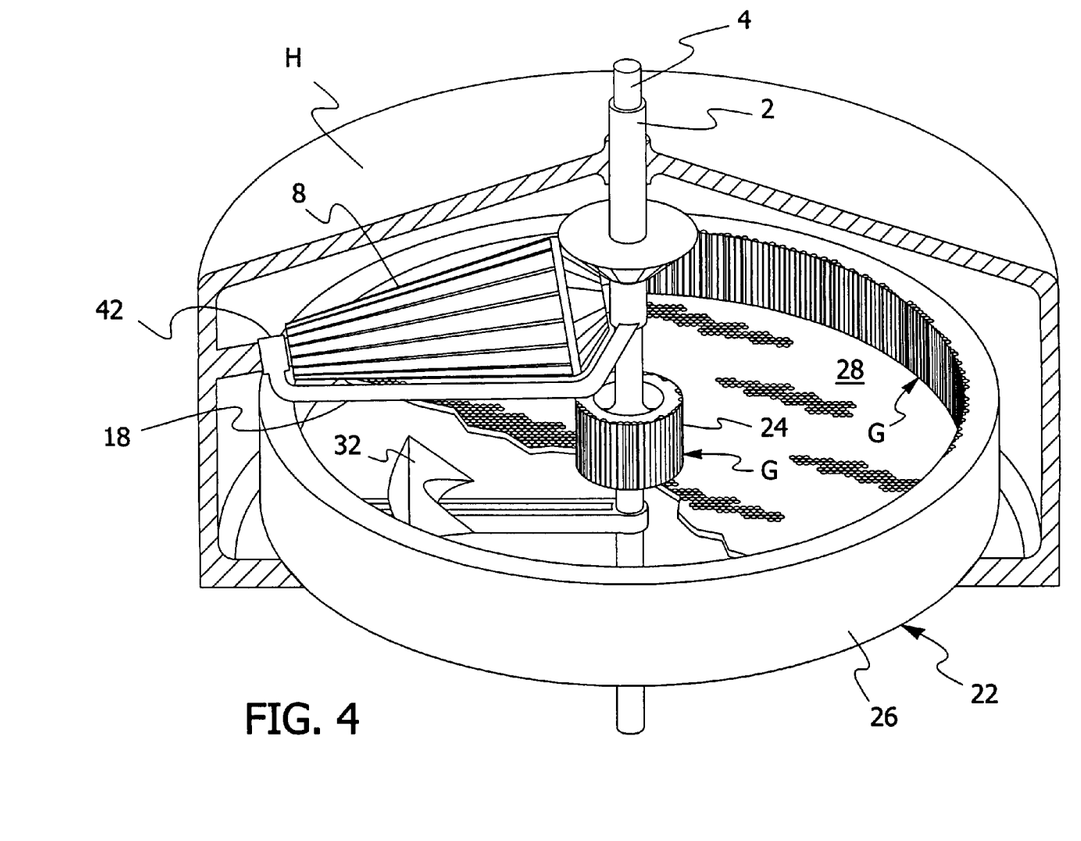
FIG. 4 is a broken away partial cross sectional perspective view with the pins removed from the pin carrier and showing the pin receiving grooves on the outer rim and inner hub as well as one side of the yoke about the conical drive.

In FIG. 1, the transmission T includes a housing H. Positioned in the housing H is an input drive 2 and an output drive 4. The input drive 2 would be typically connected to a power source such as a combustion engine and electrical turbine etc. The output drive 4 would be typically connected to a machine device as for example an automobile wheel drive shaft. A bevel gear 6 is driven by input drive 2. Conical gear 8 has a bevel gear 10 meshing with bevel gear 6. The conical gear 8 and its bevel gear 10 are mounted on conical gear shaft 12 which is connected to output drive 4. The conical gear shaft 12 is connected at its other end with a wheel support bearing 14 for a wheel 16. As best shown in FIG. 4, a pin depressing yoke 18 surrounds the conical gear 8. In FIG. 4 only one side of the yoke 18 is illustrated. The other side is identical thereto. The yoke 18 is connected to the wheel support bearing 14 and the output shaft 4 at journal 20. Mounted in the housing H is a circular pin carrier 22. The pin carrier 22 includes a hub 24 mounted on output drive 4 and a rim 26 mounted on the housing H. The pin carrier includes a circular grill 28 for receiving pins 30. The outer rim 26 and inner hub 24 include vertical flanges extending above and below the circular grill 28. Pins 30 are of a length substantially that height of the hub 24 and rim 26. The pins 30 will be subsequently described in detail. Beneath the pin carrier 22 is a pin lifter 32 connected to a piston mechanism 34 shown in FIG. 1 and supported by a pin lifter support 36. The pin lifter 32 is shown in detail in FIGS. 2 and 3. In FIG. 2 the pin lifter is shown as having an outer convex face 38 of a curvature substantially the same as the curvature of the rim 26 so as to engage the rim 26 when the pin lifter 32 is shifted outwardly to the rim 26. The inner concave face 40 is designed to engage the hub 24 when the pin lifter 32 is shifted inwardly to the hub 24. The surfaces of the pin lifter 32 are smooth and rounded to properly engage the pins 30 when changing drive speed.

Figure 5:
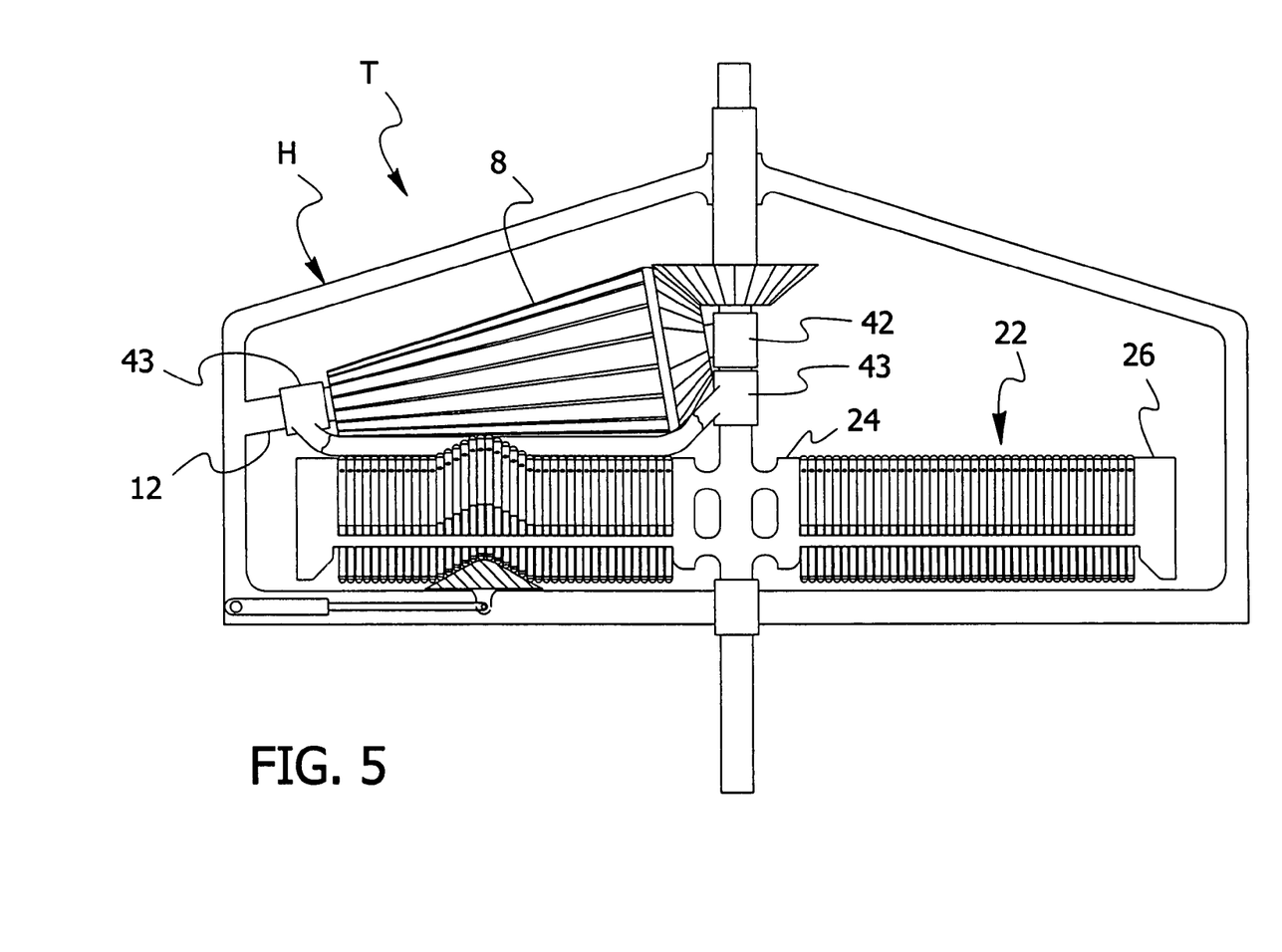
FIG. 5 is a modification of the invention of FIG. 1 showing the conical gear being stationary and the pin carrier being rotatable.

In FIG. 5 the conical gear 8 is shown as mounted on a bearing sleeve 42 and the yoke 18 is mounted on bearing sleeves 43.

It is to be noted in FIG. 4 that the hub 24 and the rim 26 have pin support grooves G to maintain the pins in the pin carrier 22 stationary without slippage.

FIG. 5

FIG. 5 shows an alternative configuration of the invention in which the conical gear 8 is non-rotatable in the housing H whereas the pin carrier 22 is rotatable. It is obvious in all configurations that the input drive 2 and the output drive 4 may be reversed and 2 could become the output drive and 4 could become the input drive.

Figure 6:
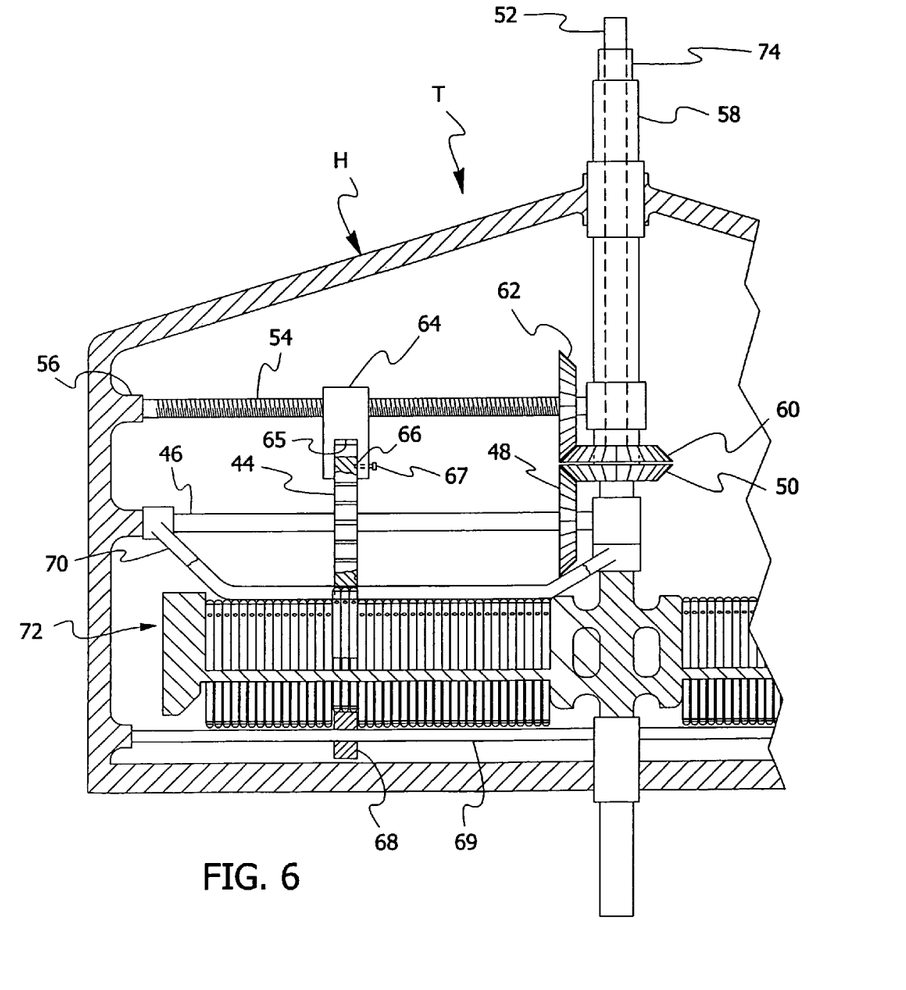
FIG. 6 shows a side elevation fragmentary partial cross sectional view of a modification of the invention.
Figure 7:
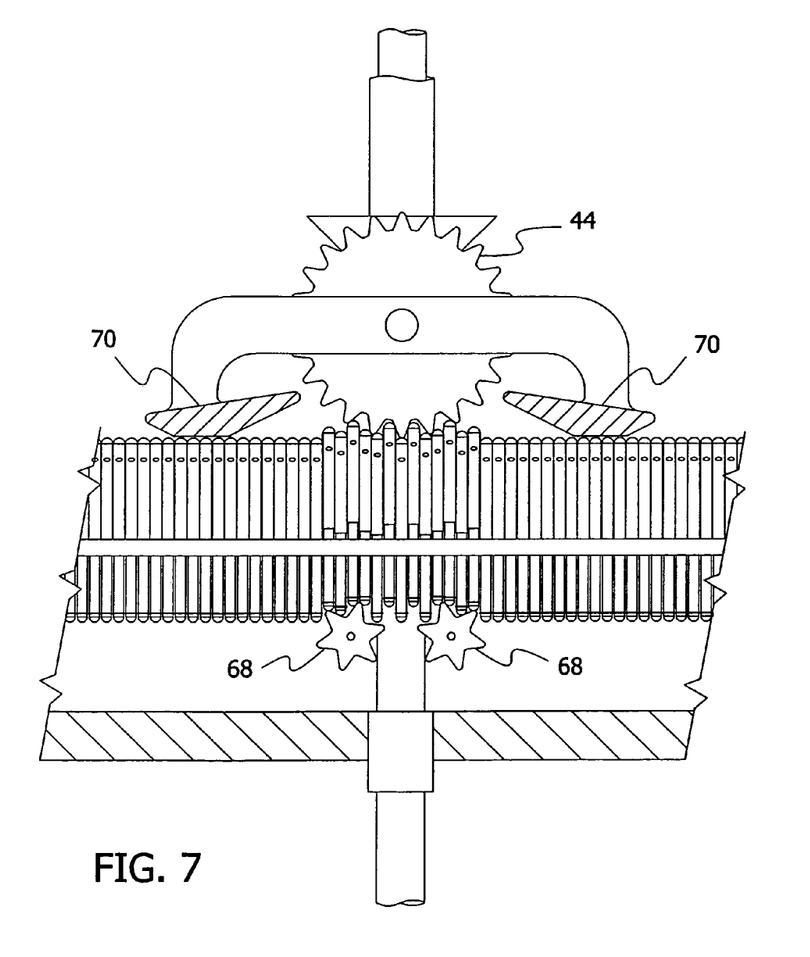
FIG. 7 is a side elevation fragmentary partial cross sectional view of the invention shown 90° from that shown in FIG. 6.

FIGS. 6 AND 7

FIGS. 6 and 7 shows the transmission T as having a sun gear 44 instead of conical gear 8. The sun gear 44 is mounted on shaft 46 which is connected to bevel gear 48 which is driven by bevel gear 50. Bevel gear 50 is in turn connected to input drive 52.

Above the sun gear 44 is a worm shaft 54 which is journaled at 56 to the housing H. A sun gear positional drive 58 has a bevel gear 60 which drives bevel gear 62 and the worm shaft 54. A sun gear shifter lug 64 is mounted on the worm shaft 54 and has an annular groove 65 in which the sun gear 44 rides. Sun gear 44 has an annular recess 66 in which a pin 67 on lug 64 travels. When it is required to change speed, the sun gear shifter wheel 64 will be driven laterally on the worm shaft 54 thereby causing the pin lifter 68 to also move laterally on shafts 69 first selecting a new second set of pins while disengaging the previous first set of pins. A pin depressing yoke 70 is similar to yoke 18 for the transmission T in FIG. 1. It is to be noted in FIG. 7 that multiple gear teeth are engaged by multiple pins for load distribution.

In FIG. 6, the pin carrier 72 rotates and is connected to the output drive 74.

Figure 8:
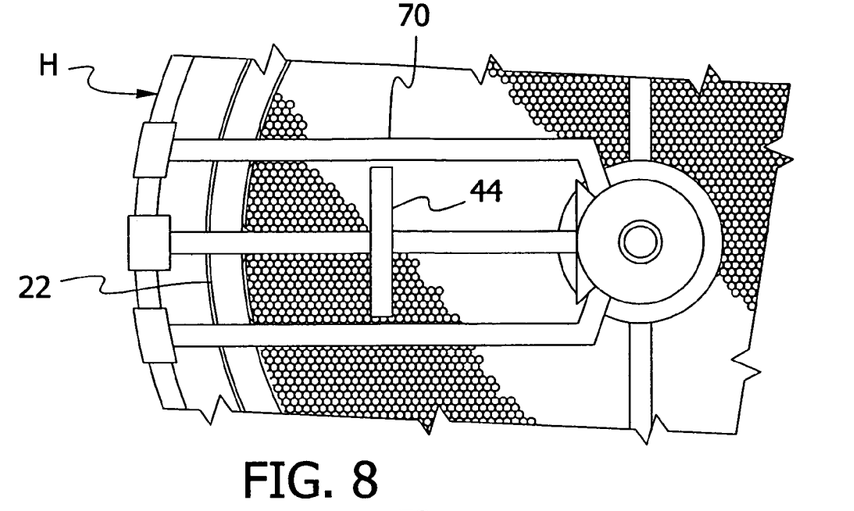
FIG. 8 is a fragmentary top elevational view of FIG. 6 showing the axial rotatable sun gear as being fixed with regard to the rotational pin carrier.
Figure 9:
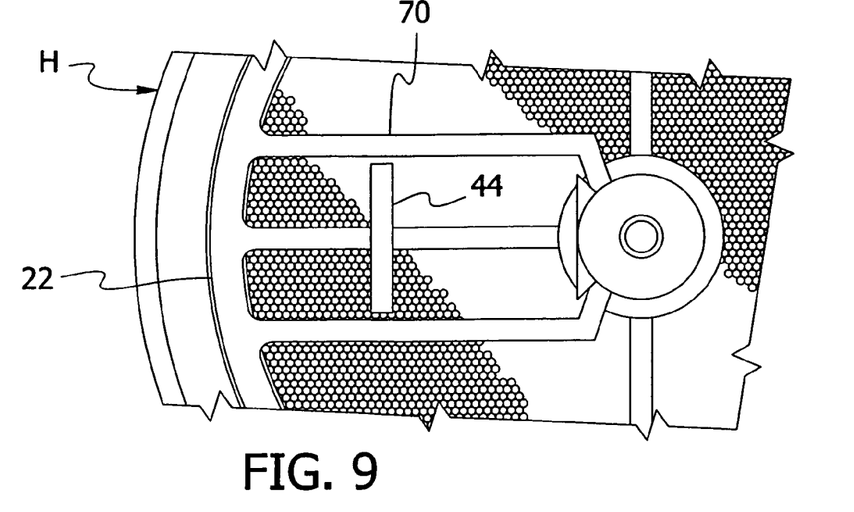
FIG. 9 is a modification of FIG. 8 showing the sun gear rotational relative to the pin carrier which is stationary.

FIGS. 8 AND 9

FIGS. 8 and 9 show two positions for the yoke 70. In FIG. 8, the yoke 72 and sun gear 44 do not move around the pin carrier 22 and are attached to the housing H and the pin carrier 22 does rotate whereas in FIG. 9 the sun gear 44 and the pin depressing yoke 70 rotate and the pin carrier 22 is fixed and stationary.

Figure 10:
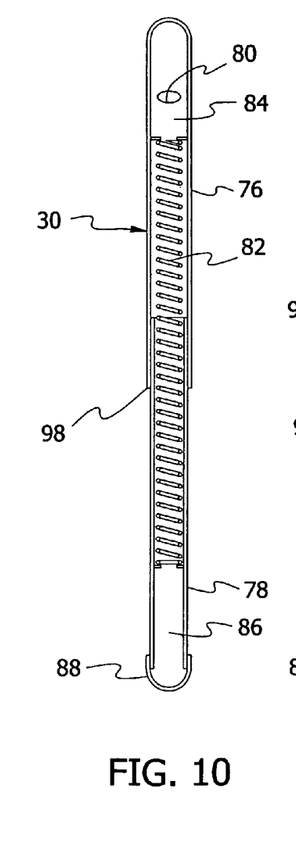
FIGS. 10-12 show cross sectional side elevational views of different pin configurations.
Figure 11:
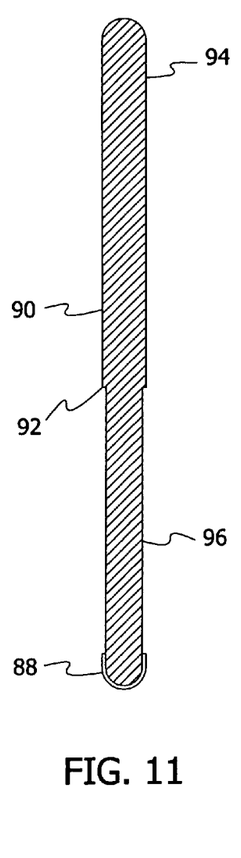
Figure 12:
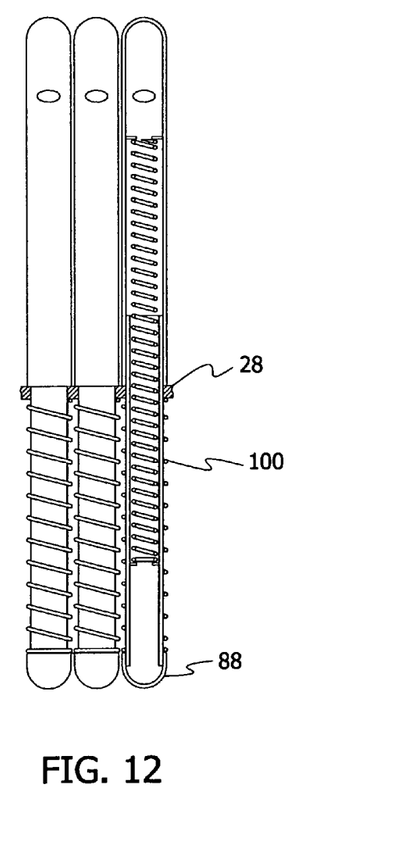

FIGS. 10, 11 AND 12

In FIG. 10, the pin has upper and lower portions 76 and 78. These are telescoping members provided with a port 80 for transmission of transmission fluid. Within the upper and lower portions 76 and 78 is a coil spring 82 under compression between spring holders 84 and 86. A cap 88 for insertion of the spring 82 is provided which may be snapped or threaded on to the lower portion 78. The upper portion 76 rests on the grill 28 and the lower portion 78 slips in the grill opening. FIG. 11 shows a solid pin 90 having a shoulder 92 between the upper portions 94 and 96. In FIG. 10, the upper pin portion 76 provides a shoulder at 98.

FIG. 12 incorporates the features of FIG. 10 and includes an outer spring 100 mounted on lower pin portion 78. This is shown as engaging the grill 28 adjacent the grill opening. The spring 100 rests against the cap 88 and provides a return mechanism for the pins as they are pushed upward against the conical gear 8 or the sun gear 44. It would not be necessary to have a yoke such as the yoke 70 or 18. It is important to this invention that the upper portions of the pins of FIGS. 10, 11, and 12 as for example 76 are in contact with the adjacent pins in order to provide a substantially solid and rigid body of pins although the upper portion of the pins are in friction engagement as noted in FIG. 12. The springs of FIGS. 10 and 12 may be of a compressable plastic material.

Although not shown in the drawings but as noted in the objects with regard to multiple gear drives it is obvious that more than one conical gear such as 8 or sun gear such as 44 and their lifters and yokes can be added into the housing on the pin carrier 22 for greater load capacity and smoother operation if necessary. Also, the transmission T may be stacked with other such transmissions.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. A non-slip variable speed transmission comprising:
 a) a housing;
 b) input and output drive shafts extending into said housing;
 c) a circular pin carrier;
 d) said pin carrier having an outer rim and an inner hub;
 e) said pin carrier having a circular grill extending between said outer rim and said inner hub;
 f) said circular grill including multiple adjacent pin receiving openings from said outer rim to said inner hub;
 g) said outer rim and said inner hub including vertical flanges extending above and below said circular grill;
 h) vertically movable identical pins mounted in each of said pin receiving openings of said grill;
 i) said pins each having upper and lower portions;
 j) said upper portions of each of said pins having a diameter greater than said lower portion of each of said pins and greater than the diameter of its respective pin receiving opening;
 k) said upper portion of said pins normally resting on said grill adjacent its respective pin receiving opening;
 l) said lower portion of each of said pins mounted in its respective pin receiving opening;

m) each of said lower portion of said pins being of a diameter substantially equal to the diameter of its respective pin receiving opening and in slideable contact in its respective pin receiving opening;

n) said pins including outer rim and inner hub engaging pins;

o) said outer rim having grooves for supporting said outer rim engaging pins;

p) said inner hub having grooves for supporting said inner hub engaging pins;

q) said pins having a length substantially equal to the height of said inner hub and outer rim;

r) a radially movable pin lifter engageable with the lower portion of a first selected number of said pins between said inner hub and said outer rim for vertical upward displacement of said first selected number of pins;

s) means mounted below said circular grill for shifting said pin lifter from between said inner hub to said outer rim for vertical upward displacement of a second selected number of pins and replacement of said first selected number of pins to vary transmission speed;

t) axially rotatable gear means cooperating with said pin lifter and connected to one of said drive shafts and mounted above said circular grill and engageable with said upper portions of said vertically displaced selected number of pins; and u) a circumferential rotatable support connection rotatable on an X axis and connected to either of said drive means.

2. A non-slip variable transmission as in claim 1, and wherein:
a) said pins are solid.

3. A non-slip variable transmission as in claim 1, and wherein:
a) said pins are spring biased.

4. A non-slip variable transmission as in claim 1, and wherein:
a) said axially rotatable gear means is conical.

5. A non-slip variable transmission as in claim 1, and wherein:
a) said axially rotatable gear means is a sun gear.

6. A non-slip variable transmission as in claim 1, and including:
a) means for replacing said vertically displaced first selected number of pins when said gear means and pin lifter are shifted to said second selected number of vertically upward displaced pins.

7. A non-slip variable transmission as in claim 6, and wherein:
a) said means for replacing said vertically displaced pins includes a pin depressing cam yoke surrounding said axially rotatable gear means.

8. A non-slip variable transmission as in claim 1, and wherein:
a) said upper portion of said pins are in friction contact with the upper portion of adjacent pins creating a substantially solid and rigid body pins.

9. A non-slip variable transmission as in claim 3, and wherein:

a) said upper and lower portions of each of said pins are telescoping sleeves with said lower portion of said pins telescoping into said upper portion of said pins; and b) said sleeves being internally spring biased including a compression spring positioned in said lower portion of said pin and extending into said upper portion of said pin.

10. A non-slip variable transmission as in claim 9, and wherein:
a) said lower portion of each of said pins includes a removable cap.

11. A non-slip variable transmission as in claim 10, and wherein:
a) said cap included a lip having a diameter greater than the diameter of said lower portion of said pin; and
b) an external spring externally mounted on said lower portion of said pin and having upper and lower ends;
c) said lower end of said external spring engaging said lip of said cup; and
d) said upper end of said external spring engaging said grill adjacent said pins respective pin receiving opening.

12. A non-slip variable transmission as in claim 3, and wherein:
a) said spring biased pins each include a coil spring.

13. A non-slip variable transmission as in claim 3, and wherein:
a) said spring biased pins each include a compressible plastic material.

14. A non-slip variable transmission as in claim 1, and wherein:
a) said circular pin carrier is rotatable on said X axis with said circumferential rotatable support connection; and
b) said axially rotatable gear means is fixed to said housing.

15. A non-slip variable transmission as in claim 1, and wherein:
a) said axially rotatable gear means is circumferentially rotatable on said X axis with said circumferential rotatable support connection; and
b) said circular pin carrier is fixed to said housing.

16. A non-slip variable transmission as in claim 11, and wherein:
a) said circumferential rotatable support connection includes tracking wheels riding on said outer rim of said pin carrier.

17. A non-slip variable transmission as in claim 4, and wherein:
a) said conical gear include a pin depressing yoke about said conical gear.

18. A non-slip variable transmission as in claim 1, and wherein:
a) said pin lifter is a piston device.

19. A non-slip variable transmission as in claim 5, and including:
a) a worm drive mechanism for shifting said sun gear.

20. A non-slip variable transmission as in claim 1, and wherein:
a) said axially rotatable gear means has multiple gear teeth simultaneously engaging multiple vertical displaced pins.

* * * * *